United States Patent [19]

Whitman

[11] Patent Number: 4,508,209

[45] Date of Patent: Apr. 2, 1985

[54] ACCESSORY ATTACHMENT FOR CONVEYORS

[75] Inventor: Bruce Whitman, Lowell, Mich.

[73] Assignee: Lear Siegler, Inc., Grand Rapids, Mich.

[21] Appl. No.: 540,316

[22] Filed: Oct. 11, 1983

[51] Int. Cl.³ .............................................. B65G 21/06
[52] U.S. Cl. ...................................... 198/583; 198/346
[58] Field of Search ................... 198/583, 584, 346; 403/252, 353

[56] References Cited

U.S. PATENT DOCUMENTS

| | | | |
|---|---|---|---|
| 1,380,691 | 6/1921 | Tuohy | 198/583 |
| 1,904,708 | 4/1933 | Adams | 198/346 |
| 2,467,136 | 4/1949 | Jones | 198/583 |
| 2,588,282 | 3/1952 | Orwin | 198/346 |
| 3,315,996 | 4/1967 | Sedo | 403/252 |

Primary Examiner—Joseph E. Valenza
Assistant Examiner—Michael Stone
Attorney, Agent, or Firm—Price, Heneveld, Huizenga & Cooper

[57] ABSTRACT

An accessory attachment for a conveyor has one or more straps mounted on the accessory which can be seated in openings in the side rail of the conveyor. Openings are provided at suitable intervals to permit accessory relocation along the conveyor. The lower end of the strap is inclined to form a cam finger to pull the accessory tightly against the conveyor to form a stop against further downward movement when the top of the strap engages under the wall forming the upper end of the opening in the conveyor rail to prevent unintentional upward movement. The strap has sufficient resilience to permit it to be flexed when it is desired to detach the accessory.

12 Claims, 4 Drawing Figures

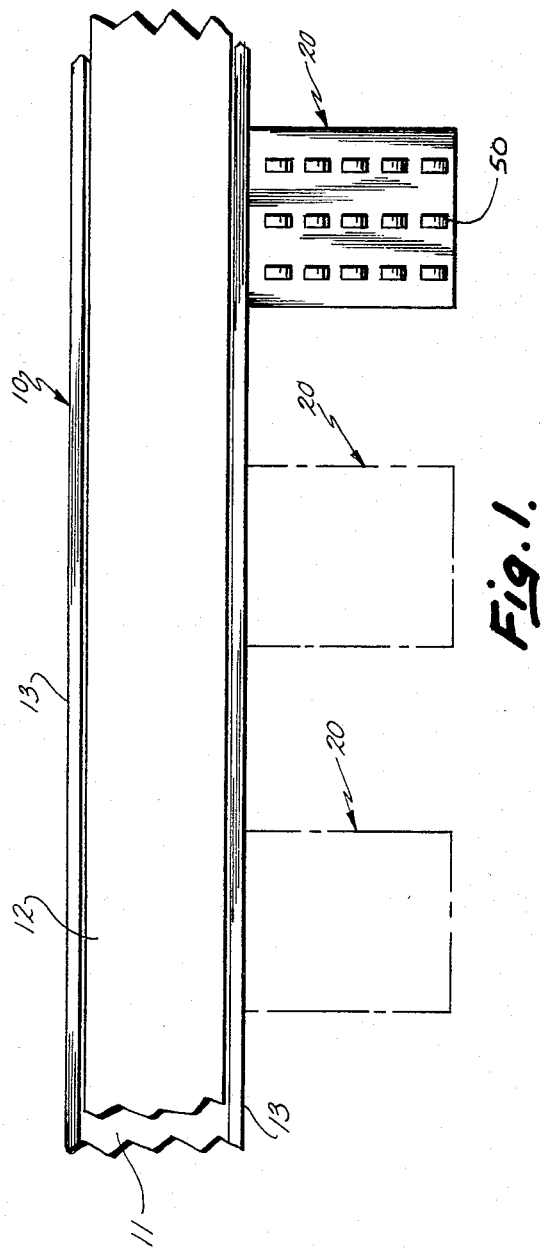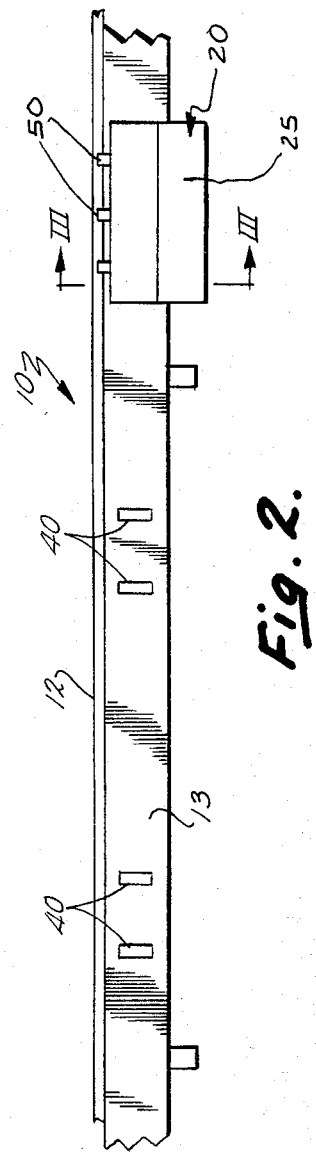

ACCESSORY ATTACHMENT FOR CONVEYORS

FIELD OF THE INVENTION

This invention relates to accessories for conveyors and more particularly to attachments to be secured to a conveyor for any one of a number of purposes such as to provide a work station or the like.

BACKGROUND OF THE INVENTION

It has become increasingly necessary in conveyor installations to provide flexibility, that is, adaptability of the conveyor to changing conditions. The concept of conveyors as being solely a transporting device has long been displaced by the concept that the conveyor is a means of tying together a number of different functions, various ones of which require the articles to be temporarily displaced from the conveyor so that some type of operation may be performed on them. The concept of initially designing the conveyor so that it provides a permanent layout for the performance of these functions has been replaced by the recognition of the need for adaptability to conveyor usage. To this end, provision for permanent or temporary removal of articles from the conveyor at various points along its length needs to be changed from time to time. In the past, this has involved substantial time and expense because the adaptation of the conveyor from one operation to another involved substantial labor. The increasing cost of labor coupled with the increasing frequency of such changes indicates the desirability of making such changes as simple as possible.

BRIEF DESCRIPTION OF THE INVENTION

The invention provides a construction of a simple and reduced number of components which permits the accessory facility for the conveyor to be relocated along the conveyor without the use of any special tools or skills. Thus, a small number of such accessories can serve a substantial length of conveyor by being quickly and easily relocated along the conveyor to those points at which they are needed. The invention provides a means of attachment of the accessory to the conveyor which permits removal and relocation with minimum of time loss and without modification of either the accessory or the conveyor. Neither fasteners nor tools are required. At the same time the accessory, while attached to the conveyor, is positively held against unintentional movement or detachment due to the forces acting on it such as the momentum of the articles moving on and off it or the forces generated by any of the operations carried out on the article while it is on the accessory.

DESCRIPTION OF THE DRAWINGS

FIG. 1 is a fragmentary plan view of a conveyor to which an accessory incorporating this invention has been attached and, in phantom, illustrating additional positions at which the accessory might be located;

FIG. 2 is a side elevation view of the conveyor and accessory;

BRIEF DESCRIPTION OF THE PREFERRED EMBODIMENT

The numeral 10 identifies a conveyor of conventional construction having a bed 11 and a powered article transporting belt 12. The belt is slidably supported on the bed 11. The bed is supported on each side by box-like rails 13. To this extent the conveyor is of conventional construction. The conveyor itself can be of a number of different types and may be either gravity or powered. It may be a wheel conveyor or a roller conveyor. If it is powered it can also be of the accumulator type and the belt can be beneath the conveyor bed to drive the rollers from beneath or it may be located in a central medial lane. The utility of the invention is quite independent of the type of conveyor.

Figure 3:
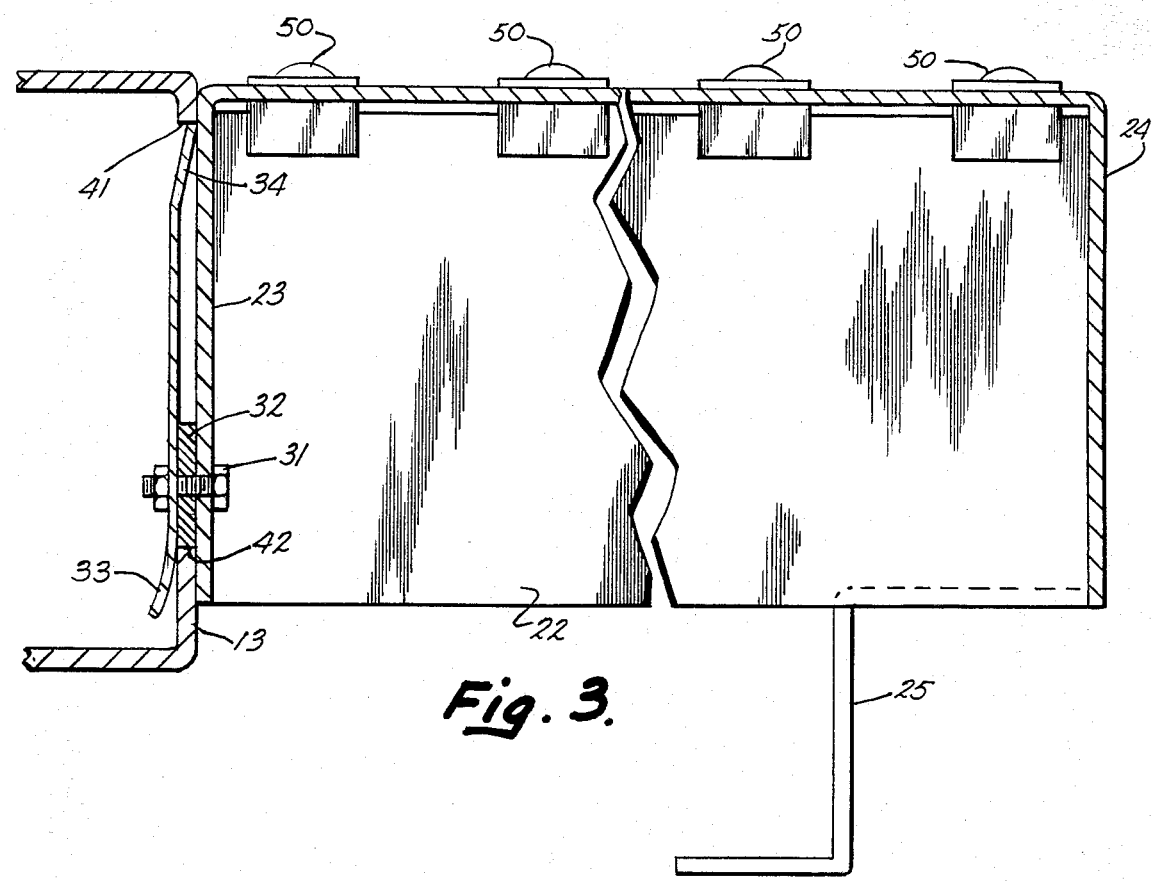
FIG. 3 is an enlarged fragmentary view taken from the plane III—III of FIG. 2.
Figure 4:
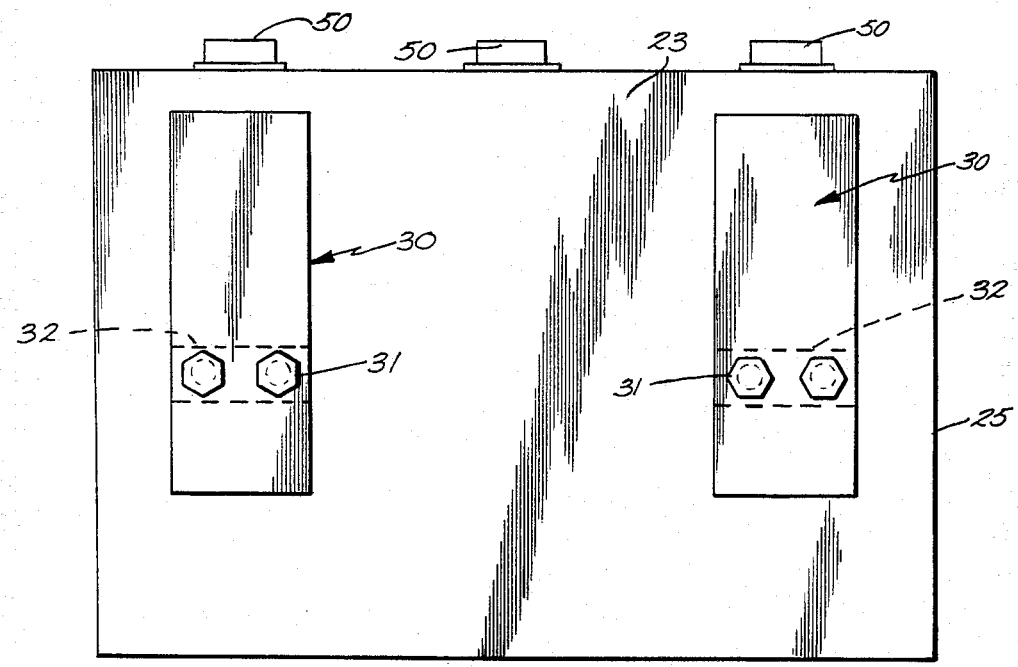
FIG. 4 is an end elevation view of the accessory.

The accessory 20, as illustrated, is an article support or platform 21 formed of metal which, in the particular form illustrated, has side flanges 22, a front flange 23 and a rear flange 24. At its rearward end the platform is provided with a supporting leg 25 of a length such that it will rest on the floor or other suitable surface when the accessory is secured in place. At the forward end of the accessory 20, a pair of anchor straps 30 are provided (FIGS. 3 and 4). Each anchor strap is secured intermediate its ends to the front flange 23 of the platform by suitable means such as the bolts 31 and at the point of attachment is spaced outwardly from the flange by a spacer 32. The thickness of the spacer 32 is equal to the wall thickness of the rail 13 of the conveyor bed. Below the bolts 31 the end of the strap is curved downwardly and away from the flange 23 so that the lower free end of the strap is substantially further from the flange than the thickness of the rail 13. This curved end forms a cam finger 33.

The central portion of the strap is straight, extends parallel to the flange 23 but spaced from it the thickness of the spacer 32 up to a point adjacent the upper end where the flange is bent to incline toward the flange 23, preferably to a point that its upper end contacts the flange. This inclined portion forms the locking finger 34. A pair of the straps 30 are provided on the platform and spaced apart a substantial portion of the width of the platform. It will be seen from this description that the shape of the strap is generally that of a largely flattened "S".

For cooperation with the straps 30, the side rails of the conveyor at spaced intervals are provided with pairs of vertically elongated openings 40. The spacing of the pairs of openings is dependent upon the spacing to be maintained between the platforms or the degree of flexibility considered desirable to permit relocation of the platform along the conveyor.

As will be best understood from FIG. 3, when the platform is secured in working position, the upper ends of the locking fingers 34 preferably are seated against the upper end walls of the slotted openings 40 and the walls 42 forming the lower ends of the openings are wedged between the flange 23 and the cam finger 33 and the lower edges of the spacers 32 are seated on the lower walls 42. The engagement between the spacers and the lower walls provides a stop limiting downward movement of the inner end of the platform. Thus, the ends of the locking fingers 33 and the lower edge of the spacer 32 become a pair of spaced stops acting in opposite directions. While it is preferable to have engagement between the upper ends of the straps and upper walls 42, a small clearance such as a few hundredths of an inch is acceptable. In this manner the anchor straps 30 positively secure the platform to the conveyor, holding it against detachment by upward movement of the front end of the platform while the front end is also supported positively against downward movement. Since a pair of the straps are provided for each platform, the platform is positively held against twisting motion resulting from normal usage which would misalign it with the conveyor.

To remove the platform, it is forcibly twisted to move one corner away from the side rail sufficiently to pull the upper end of the adjacent strap out of the opening. That corner of the platform is then lifted slightly to prevent reentry while this maneuver is repeated with the opposite corner. Once this has been done the platform can be lifted free of the conveyor. It will be recognized that for this purpose the straps 30 have to be made of a resilient, tempered steel of sufficient strength to hold the platform positively when it is in the locked position illustrated in FIG. 3 without bending the cam fingers 33 yet provide sufficient resilience that the fingers can be made to flex enough to permit the accessory unit to be twisted to effect the release. Also the resilience should hold the end of the locking finger 34 against the forward flange 23 so that the outward or lateral movement of the platform to effect detachment need be no more than the thickness of the metal of the strapping flanges. By maintaining contact between the upper end of the straps and the top walls 41 or allowing only a very small gap, the platform is positively held against being rocked about its leg 25 by a heavy load resting on its outer end.

From the preceding explanation it will be recognized that the platform can be moved readily by one or two persons depending on its size and weight from one location to another along the conveyor as changing needs dictate.

While the platform has been illustrated as equipped with article supporting rollers 50, it will be recognized that any other type of article support can be provided including simply a flat surface without rollers or other low friction article supports. How the top surface of the platform is equipped and constructed will depend upon the particular use to which the platform is to be put. It will also be recognized that the platform may be a short section of conveyor providing a means of anchoring an auxiliary conveyor to the main conveyor where it is desired to either discharge articles from the main conveyor or to induct them into the main conveyor.

It will be understood from the preceding description that the invention provides a simple, easily relocated means of equipping a conveyor with auxiliary service facilities along the conveyor wherever such facilities are needed. It also provides accessory facilities which can be quickly and easily relocated along the conveyor without the use of tools or special skills. The relocation of the accessories does not interfere with the operation of the conveyor, thus eliminating downtime. It also permits a limited number of accessories to service a wide variety of changing needs along the conveyor. The invention materially reduces labor costs and time loss.

It will be recognized that various modifications of the invention can be made without departing from the principles of the invention. Such modifications are to be considered as included in the hereinafter appended claims unless these claims, by their language, expressly state otherwise.

I claim:

1. An attachment for detachably mounting an accessory to the side rail of a conveyor, the side rail having a vertical web and the accessory having a vertical flange adapted to seat against the web, a vertically elongated aperture in said side rail; means secured to said flange having upper and lower stops spaced the vertical length of said aperture, a resilient member secured to the lower stop and flange and projecting below said lower stop and spaced from the flange to receive and clamp said web between it and said flange; the accessory projecting outwardly from said rail and having an element spaced from the rail supporting the outer end thereof when said stops are seated in said aperture and the lower one thereof is seated on the web at the lower end of said aperture.

2. The attachment as described in claim 1 wherein said lower stop has the same thickness as said web.

3. The attachment as described in claim 2 wherein the end of the resilient member projecting below said lower stop is inclined away from said flange to facilitate mounting said member over said web.

4. The attachment as described in claim 3 wherein said means includes an elongated strap the upper end of which forms said upper stop and the lower end forms said resilient member.

5. The attachment as described in claim 4 wherein the upper end of the strap is seated against the flange.

6. The attachment as described in claim 1 wherein a pair of said upper and lower stops are provided spaced lengthwise of said flange; a pair of said apertures provided in said rail spaced apart the same distance as said pairs of stops.

7. Means for detachably securing an accessory article support to a conveyor, the conveyor having side rails, the side rails having a vertical panel forming the outer edge of the conveyor, said accessory support having an article support surface and a vertical depending flange at one end and a leg at the other end, said means characterized in that a vertically elongated anchor strap is provided, said strap having an upper end seated adjacent said flange; a spacer element between said strap and said flange adjacent the lower end of said strap and means rigidly securing both the strap and spacer to said flange, said spacer element having a lower edge spaced upwardly from the lower end of said strap; the side rail of the conveyor having a vertically elongated opening of a width to pass said strap therethrough; the opening being shorter than the strap and subsequently equal in length to the spacing between the upper end of said strap and the lower edge of said spacer whereby when said accessory is secured to the conveyor, the upper end of the strap abuts the wall at the upper end of the opening and the spacer seats on the lower wall of the opening and the lower end of the strap clamps the wall at the lower end of the opening between it and the flange.

8. Means for securing an accessory article support to the side rail of a conveyor as described in claim 7 wherein said spacer has the same thickness as said web of the rail.

9. Means for securing an accessory article support to the side rail of a conveyor as described in claim 8 wherein said strap is of spring steel.

10. Means for securing an accessory article support to the side rail of a conveyor as described in claim 9 wherein said upper end of said strap is a stop limiting upward movement of the accessory with respect to the rail and the lower end is inclined away from said flange and forms a cam finger for pulling said accessory tightly against said rail as the accessory is secured to the conveyor.

11. Means for securing an accessory article support to the side rail of a conveyor as described in claim 7 wherein a pair of said straps are provided, said straps being spaced lengthwise of said flange and a pair of identically spaced openings are provided in said web.

12. Means for securing an accessory support to the side rail of a conveyor as described in claim 11 wherein a plurality of pairs of said apertures are provided arranged in tandem along said side rail whereby said accessory support can be relocated lengthwise thereof.

* * * * *